(12) United States Patent
Noh et al.

(10) Patent No.: US 9,973,310 B2
(45) Date of Patent: *May 15, 2018

(54) METHOD AND APPARATUS FOR TRANSMITTING SOUNDING REFERENCE SIGNAL IN RADIO COMMUNICATION SYSTEM

(71) Applicant: LG ELECTRONICS INC., Seoul (KR)

(72) Inventors: Min Seok Noh, Anyang-si (KR); Jae Hoon Chung, Anyang-si (KR); Yeong Hyeon Kwon, Anyang-si (KR); Seung Hee Han, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/592,479

(22) Filed: May 11, 2017

(65) Prior Publication Data

US 2017/0257197 A1 Sep. 7, 2017

Related U.S. Application Data

(63) Continuation of application No. 13/320,723, filed as application No. PCT/KR2010/003102 on May 17, 2010, now Pat. No. 9,680,613.

(Continued)

(30) Foreign Application Priority Data

May 14, 2010 (KR) ........................ 10-2010-0045446

(51) Int. Cl.
*H04L 29/06* (2006.01)
*H04L 5/00* (2006.01)

(52) U.S. Cl.
CPC .......... *H04L 5/0007* (2013.01); *H04L 5/0048* (2013.01)

(58) Field of Classification Search
CPC ...................................................... H04L 5/0007
See application file for complete search history.

(56) References Cited

U.S. PATENT DOCUMENTS

| 4,713,808 A | 12/1987 | Gaskill et al. |
| 7,349,375 B2 | 3/2008 | Gerakoulis |

(Continued)

FOREIGN PATENT DOCUMENTS

| CN | 101106395 A | 1/2008 |
| CN | 101330325 A | 12/2008 |

(Continued)

OTHER PUBLICATIONS

"Sounding RS parameters," 3GPP TSG RAN WG1 Meeting #52bis, Panasonic, R1-081201, Mar. 31, 2008-Apr. 4, 2008.

(Continued)

*Primary Examiner* — Parth Patel
(74) *Attorney, Agent, or Firm* — Birch, Stewart, Kolasch & Birch, LLP

(57) ABSTRACT

A method for transmitting an aperiodic sounding reference signal (SRS) to a base station by a user equipment (UE) in a wireless communication system, the method includes receiving, from the base station, an uplink grant or a downlink grant, with an indicator indicating a transmission of the aperiodic SRS; and transmitting, to the base station, the aperiodic SRS in a first uplink subframe; wherein the first uplink subframe is a subframe firstly configured after a second uplink subframe for the aperiodic SRS, wherein, if the uplink grant is received, the second uplink subframe is a subframe in which an uplink data signal scheduled by the uplink grant is transmitted, wherein, if the downlink grant is (Continued)

received, the second uplink subframe is a subframe in which an uplink control signal corresponding to the downlink grant is transmitted.

12 Claims, 10 Drawing Sheets

Related U.S. Application Data

(60) Provisional application No. 61/326,634, filed on Apr. 21, 2010, provisional application No. 61/310,712, filed on Mar. 5, 2010, provisional application No. 61/296,035, filed on Jan. 19, 2010, provisional application No. 61/178,818, filed on May 15, 2009.

(56) References Cited

U.S. PATENT DOCUMENTS

| | | | |
|---|---|---|---|
| 8,145,127 B2 | 3/2012 | Nory et al. | |
| 8,195,186 B2 | 6/2012 | Mitra et al. | |
| 8,351,347 B2 | 1/2013 | Noh et al. | |
| 8,391,234 B2 | 3/2013 | Nouda et al. | |
| 8,913,578 B2 * | 12/2014 | Noh | H04L 5/0051 370/280 |
| 9,661,588 B2 * | 5/2017 | Takaoka | H04W 52/367 |
| 9,673,952 B2 * | 6/2017 | Chen | H04L 5/0053 |
| 9,680,613 B2 * | 6/2017 | Noh | H04L 5/0007 |
| 2006/0035643 A1 | 2/2006 | Vook et al. | |
| 2007/0230460 A1 | 10/2007 | Jeong et al. | |
| 2008/0045260 A1 | 2/2008 | Muharemovic et al. | |
| 2008/0200203 A1 * | 8/2008 | Malladi | H04W 52/287 455/522 |
| 2008/0207150 A1 * | 8/2008 | Malladi | H04W 52/08 455/127.1 |
| 2008/0305745 A1 | 12/2008 | Zhang et al. | |
| 2009/0034468 A1 | 2/2009 | Muharemovic et al. | |
| 2009/0042615 A1 * | 2/2009 | Teo | H04B 7/0691 455/562.1 |
| 2009/0046800 A1 | 2/2009 | Xu et al. | |
| 2009/0054093 A1 | 2/2009 | Kim et al. | |
| 2009/0077444 A1 | 3/2009 | Qi et al. | |
| 2009/0088148 A1 | 4/2009 | Chung et al. | |
| 2009/0168714 A1 | 7/2009 | Tanaka et al. | |
| 2009/0181687 A1 | 7/2009 | Tiirola et al. | |
| 2009/0196249 A1 | 8/2009 | Kawamura et al. | |
| 2009/0207793 A1 * | 8/2009 | Shen | H04L 1/1858 370/329 |
| 2009/0213769 A1 | 8/2009 | Shen et al. | |
| 2009/0238121 A1 | 9/2009 | Kotecha | |
| 2009/0239476 A1 * | 9/2009 | Womack | H04L 5/0094 455/68 |
| 2009/0262695 A1 * | 10/2009 | Chen | H04L 5/0053 370/329 |
| 2009/0274076 A1 | 11/2009 | Muharemovic et al. | |
| 2009/0274226 A1 * | 11/2009 | Mondal | H04L 5/0023 375/260 |
| 2009/0279447 A1 | 11/2009 | Mehta et al. | |
| 2009/0279459 A1 | 11/2009 | Muharemovic et al. | |
| 2009/0290514 A1 | 11/2009 | Muharemovic et al. | |
| 2010/0069028 A1 | 3/2010 | Choi et al. | |
| 2010/0080187 A1 | 4/2010 | Papasakellariou et al. | |
| 2010/0091725 A1 * | 4/2010 | Ishii | H04W 72/04 370/329 |
| 2010/0098012 A1 | 4/2010 | Bala et al. | |
| 2010/0103902 A1 | 4/2010 | Kim et al. | |
| 2010/0118730 A1 * | 5/2010 | Tanaka | H04L 1/0028 370/252 |
| 2010/0195532 A1 * | 8/2010 | Pajukoski | H04L 5/06 370/254 |
| 2010/0202311 A1 | 8/2010 | Lunttila et al. | |
| 2010/0238845 A1 | 9/2010 | Love et al. | |
| 2010/0246561 A1 * | 9/2010 | Shin | H04W 52/32 370/345 |
| 2010/0271970 A1 | 10/2010 | Pan et al. | |
| 2010/0303013 A1 | 12/2010 | Khandekar et al. | |
| 2011/0013546 A1 | 1/2011 | Hao et al. | |
| 2011/0014909 A1 | 1/2011 | Han et al. | |
| 2011/0026478 A1 | 2/2011 | Lee et al. | |
| 2011/0038271 A1 * | 2/2011 | Shin | H04W 52/146 370/252 |
| 2011/0085457 A1 | 4/2011 | Chen et al. | |
| 2011/0090862 A1 | 4/2011 | Liang et al. | |
| 2011/0092240 A1 | 4/2011 | Aiba et al. | |
| 2011/0098054 A1 * | 4/2011 | Gorokhov | H04B 7/024 455/452.1 |
| 2011/0110398 A1 | 5/2011 | Zhang et al. | |
| 2011/0142095 A1 | 6/2011 | Guo et al. | |
| 2011/0222411 A1 * | 9/2011 | Koskinen | H04L 1/0026 370/241 |
| 2011/0261716 A1 | 10/2011 | Kim et al. | |
| 2011/0280206 A1 | 11/2011 | Johansson et al. | |
| 2012/0002568 A1 | 1/2012 | Tiirola et al. | |
| 2012/0039273 A1 * | 2/2012 | Nam | H04L 5/0005 370/329 |
| 2012/0044857 A1 | 2/2012 | Kim et al. | |
| 2012/0082124 A1 | 4/2012 | Kwon et al. | |
| 2012/0093119 A1 | 4/2012 | Kim et al. | |
| 2012/0178502 A1 | 7/2012 | Teo et al. | |
| 2012/0218967 A1 | 8/2012 | Noh et al. | |
| 2012/0281625 A1 | 11/2012 | Noh et al. | |
| 2013/0078913 A1 * | 3/2013 | Lee | H04L 5/0007 455/39 |
| 2013/0094448 A1 | 4/2013 | Noh et al. | |
| 2013/0121280 A1 * | 5/2013 | Ouchi | H04W 72/14 370/329 |
| 2013/0194908 A1 * | 8/2013 | Gao | H04L 5/0048 370/203 |
| 2013/0215838 A1 | 8/2013 | Aiba et al. | |
| 2013/0242895 A1 * | 9/2013 | Chen | H04L 5/0051 370/329 |
| 2013/0294382 A1 | 11/2013 | Xu et al. | |
| 2015/0245300 A1 * | 8/2015 | Suzuki | H04W 52/146 455/522 |
| 2016/0344526 A1 * | 11/2016 | Fan | H04L 5/0048 |

FOREIGN PATENT DOCUMENTS

| | | |
|---|---|---|
| CN | 101335969 A | 12/2008 |
| EP | 1 916 782 A1 | 4/2008 |
| EP | 2 023 504 A2 | 2/2009 |
| EP | 2 086 266 A2 | 8/2009 |
| JP | 2009-60595 A | 3/2009 |
| JP | 2012-503406 A | 2/2012 |
| JP | 2012-521173 A | 9/2012 |
| KR | 10-2006-0096018 A | 9/2006 |
| KR | 10-2008-0093319 A | 10/2008 |
| KR | 10-2008-0096336 A | 10/2008 |
| KR | 10-2008-0112115 A | 12/2008 |
| KR | 10-2009-0014978 A | 2/2009 |
| KR | 10-2009-0086031 A | 8/2009 |
| KR | 10-2009-0094752 A | 9/2009 |
| WO | WO 2008/101055 A2 | 8/2008 |
| WO | WO 2008/120925 A1 | 10/2008 |
| WO | WO 2008/156293 A2 | 12/2008 |
| WO | WO 2009/046009 A2 | 4/2009 |
| WO | WO 2009/058806 A1 | 5/2009 |
| WO | WO 2009/088206 A2 | 7/2009 |
| WO | WO 2010/036053 A2 | 4/2010 |

OTHER PUBLICATIONS

"SRS Transmission Issues for LTE-A," 3GPP TSG RAN WG1 #55bis, Samsung, R1-090100, Jan. 14, 2009-Jan. 18, 2009.
"UE transmit antenna selection—Technical aspects," 3GPP TSG RAN WG1 Meeting #55, NextWave Wireless, IP Wireless, R1-084432, Nov. 10, 2008-Nov. 14, 2008.
"UL Sounding Reference Signal," 3GPP TSG RAN WG1 #49bis, Nokia Siemens Networks, Nokia, R1-072988, Jun. 25, 2007-Jun. 29, 2007.

(56) References Cited

OTHER PUBLICATIONS

CMCC, "Related issues on PDDCH carrier indication," 3GPP TSG RAN WG1 meeting #58, R1-093268, pp. 1-3, Aug. 24-28, 2009.
Interdigital Communications, LLC, "Cross Carrier Operation for Bandwidth Extension," 3GPP TSG-RAN WG1 Meeting #58, R1-093067, Aug. 24-28, 2009, pp. 1-6.
Mitsubishi Electric, "UL Sounding RS Control Signaling for Antenna Selection," 3GPP RAN1 #50bis, R1-073932, pp. 1-9, Oct. 8-12, 2007.
Qualcomm Europe, "Confirmation of various UL transmission configurations," 3GPP TSG-RAN WG1 #54, R1-083174, Aug. 18-22, 2008, pp. 1-4.
Samsung "SRS Transmission Issues in LTE-A," 3GPP TSG RAN WG1 #57, R1-091879, pp. 1-3, May 4-8, 2009.
Samsung, "ACK/NAK Repetitions in E-UTRA UL," 3GPP TSG RAN WG1 #53bis, R1-082303, pp. 1-5, Jun. 30-Jul. 4, 2008.
Samsung, "SRS Transmission Issues in LTE-A," 3GPP TSG RAN WG1 #57bis, R1-092677, pp. 1-3, Jun. 29-Jul. 3, 2009.
Toskala et al., "LTE for UMTS: OFDMA and SC-FDMA Based Radio Access," Physical Layer, Chapter 5, pp. 1-53, Jun. 12, 2009.

\* cited by examiner (a) Control-plane protocol stack (b) User-plane protocol stack

METHOD AND APPARATUS FOR TRANSMITTING SOUNDING REFERENCE SIGNAL IN RADIO COMMUNICATION SYSTEM

CROSS-REFERENCE TO RELATED APPLICATIONS

This Application is a Continuation of co-pending U.S. patent application Ser. No. 13/320,723 filed on Nov. 15, 2011, which is the National Phase of PCT/KR2010/003102 filed on May 17, 2010, which claims the benefit under 35 U.S.C. § 119(e) to U.S. Provisional Application Nos. 61/326,634 filed on Apr. 21, 2010, 61/310,712 filed on Mar. 5, 2010, 61/296,035 filed on Jan. 19, 2010 and 61/178,818 filed on May 15, 2009, and under 35 U.S.C. § 119(a) to Korean Patent Application No. 10-2010-0045446 filed on May 14, 2010, all of which are hereby expressly incorporated by reference into the present application.

BACKGROUND OF THE INVENTION

Field of the Invention

The present invention relates to a wireless communication system, and more particularly, to a method for transmitting sounding reference signals to a base station at a user equipment in a wireless communication system, and an apparatus therefor.

Discussion of the Related Art

As an example of a mobile communication system to which the present invention is applicable, a 3rd Generation Partnership Project Long Term Evolution (hereinafter, "LTE") communication system is described in brief.

FIG. 1 is a diagram schematically showing a network structure of an E-UMTS as an exemplary radio communication system. An Evolved Universal Mobile Telecommunications System (E-UMTS) is a system evolving from a conventional Universal Mobile Telecommunications System (UMTS) and basic standardization task thereof is currently underway in the 3GPP. The E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE) 120, e Node Bs (eNBs) 110a and 110b, and an Access Gateway (AG) which is located at an end of the network (E-UTRAN) and connected to an external network. The eNode Bs may simultaneously transmit multiple data streams for a broadcast service, a multicast service, and/or a unicast service.

One or more cells may exist in one eNode B. A cell is set to use one of bandwidths of 1.25, 2.5, 5, 10, and 20 MHz to provide a downlink or uplink transport service to several UEs. Different cells may be set to provide different bandwidths. The eNode B controls data transmission and reception for a plurality of UEs. The eNode B transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNode B transmits uplink scheduling information with respect to uplink data to a corresponding UE to inform the UE of an available time/frequency domain, coding, data size, and HARQ-related information. An interface for transmitting user traffic or control traffic may be used between eNode Bs. A Core Network (CN) may include the AG, a network node for user registration of the UE, and the like. The AG manages mobility of a UE on a Tracking Area (TA) basis, wherein one TA includes a plurality of cells.

Although radio communication technology has been developed up to LTE based on Wideband Code Division Multiple Access (WCDMA), the demands and expectations of users and providers continue to increase. In addition, since other radio access technologies continue to be developed, new technical evolution is required to secure competitiveness in the future. For example, decrease of cost per bit, increase of service availability, flexible use of a frequency band, simple structure, open interface, and suitable power consumption of a UE are required.

Recently, 3GPP has been establishing a standard task for a subsequent technique of LTE. In this specification, such a technique is referred to as "LTE-Advanced" or "LTE-A". One of the main differences between an LTE system and an LTE-A system is a system bandwidth. The LTE-A system is aimed at supporting a broadband of a maximum of 100 MHz, and to this end, the LTE-A system is designed to use a carrier aggregation or bandwidth aggregation technique using a plurality of frequency blocks. Carrier aggregation employs a plurality of frequency blocks as one big logical frequency band in order to use a wider frequency band. A bandwidth of each frequency block may be defined based on a bandwidth of a system block used in the LTE system. Each frequency block is transmitted using a component carrier.

SUMMARY OF THE INVENTION

An object of the present invention is to provide a method for transmitting a plurality of sounding reference signals to a base station at a user equipment in a wireless communication system, and an apparatus therefor.

The technical objects to be achieved by the present invention are not limited to the above-mentioned technical objects, and other technical problems not mentioned above can be clearly understood by one skilled in the art from the following description.

According to one aspect of the present invention, a method for transmitting sounding reference signals at a user equipment in a wireless communication system includes receiving a transmission indication signal of an aperiodic sounding reference signal from a base station; determining a time resource for transmitting the aperiodic sounding reference signal based on a specific subframe for transmission of a previously configured periodic sounding reference signal; and transmitting the aperiodic sounding reference signal to the base station using the determined time resource.

The transmission indication signal of the aperiodic sounding reference signal may be physical layer or Medium Access Control (MAC) layer control signaling. The determination of a time resource for transmitting the aperiodic sounding reference signal may include determining one of the specific subframe, a subframe configured to first transmit the aperiodic sounding reference signal after the specific subframe, and a subframe after a predetermined time offset from the specific subframe, as the time resource for transmitting the aperiodic sounding reference signal.

The transmission indication signal of the aperiodic sounding reference signal may include at least one of information about the number of transmissions of the aperiodic sounding reference signal, a transmission duration, and a transmission interval. The transmission interval may be expressed by a multiple of a transmission period of the periodic sounding reference signal.

A transmission bandwidth of the aperiodic sounding reference signal may be a total bandwidth of uplink transmission of the user equipment. The method may further include receiving a transmission release signal of the aperiodic sounding reference signal from the base station, and stopping transmitting the aperiodic sounding reference signal after receiving the transmission release signal.

Parameters for the aperiodic sounding reference signal are transmitted through physical layer or Medium Access Control (MAC) layer control signaling.

According to another aspect of the present invention, a user equipment in a wireless communication system includes a reception module for receiving a transmission indication signal of an aperiodic sounding reference signal from a base station; a processor for determining a time resource for transmitting the aperiodic sounding reference signal based on a specific subframe for transmission of a previously configured periodic sounding reference signal; and a transmission module for transmitting the aperiodic sounding reference signal to the base station using the determined time resource.

The transmission indication signal of the aperiodic sounding reference signal may be physical layer or Medium Access Control (MAC) layer control signaling. The processor may determine one of the specific subframe, a subframe configured to first transmit the aperiodic sounding reference signal after the specific subframe, and a subframe after a predetermined time offset from the specific subframe, as the time resource for transmitting the aperiodic sounding reference signal.

The transmission indication signal of the aperiodic sounding reference signal may include at least one of information about the number of transmissions of the aperiodic sounding reference signal, a transmission duration, and a transmission interval. The transmission interval may be expressed by a multiple of a transmission period of the periodic sounding reference signal.

A transmission bandwidth of the aperiodic sounding reference signal may be a total bandwidth of uplink transmission.

Parameters for the aperiodic sounding reference signal may be transmitted through physical layer or Medium Access Control (MAC) layer control signaling. The reception module may receive a transmission release signal of the aperiodic sounding reference signal from the base station, and the transmission module may stop transmitting the aperiodic sounding reference signal after receiving the transmission release signal.

According to the embodiments of the present invention, a user equipment can effectively transmit sounding reference signals in a wireless communication system to which carrier aggregation is applied.

The effects which can be obtained from the present invention are not limited to the above-mentioned effects, and other effects not mentioned above can be clearly understood by one skilled in the art from the following description of the embodiments of the present invention.

DETAILED DESCRIPTION OF THE INVENTION

Hereinafter, structures, operations, and other features of the present invention will be understood readily from the embodiments of the present invention, examples of which are illustrated in the accompanying drawings. Embodiments described later are examples in which technical features of the present invention are applied to a 3GPP system.

Hereinafter, a system that includes a system band of a single frequency block will be referred to as a legacy system or a narrowband system. By contrast, a system that includes a system band of a plurality of frequency blocks and uses at least one or more frequency blocks as a system block of a legacy system will be referred to as an evolved system or a wideband system. The frequency block used as a legacy system block has the same size as the system block of the legacy system. On the other hand, there is no limitation as to the sizes of the other frequency blocks. However, for system simplification, the sizes of the other frequency blocks may be determined based on the size of the system block of the legacy system. For example, the 3GPP LTE (Release-8) system and the 3GPP LTE-A (Release-9) system are legacy system and evolved system relations.

Based on the aforementioned definition, the 3GPP LTE (Release-8) system will herein be referred to as an LTE system or the legacy system. Also, a user equipment that supports the LTE system will be referred to as an LTE user equipment or a legacy user equipment. The 3GPP LTE-A (Release-9) system will be referred to as an LTE-A system or an evolved system. Also, a user equipment that supports the LTE-A system will be referred to as an LTE-A user equipment or an evolved user equipment.

For convenience, although the embodiments of the present invention will be described based on the LTE system and the LTE-A system, the LTE system and the LTE-A system are only exemplary and the embodiments of the present invention can be applied to all communication systems corresponding to the aforementioned definition. Also, although the embodiments of the present invention will herein be described based on FDD mode, the FDD mode is only exemplary and the embodiments of the present invention can easily be applied to H-FDD mode or TDD mode.

Figure 1:
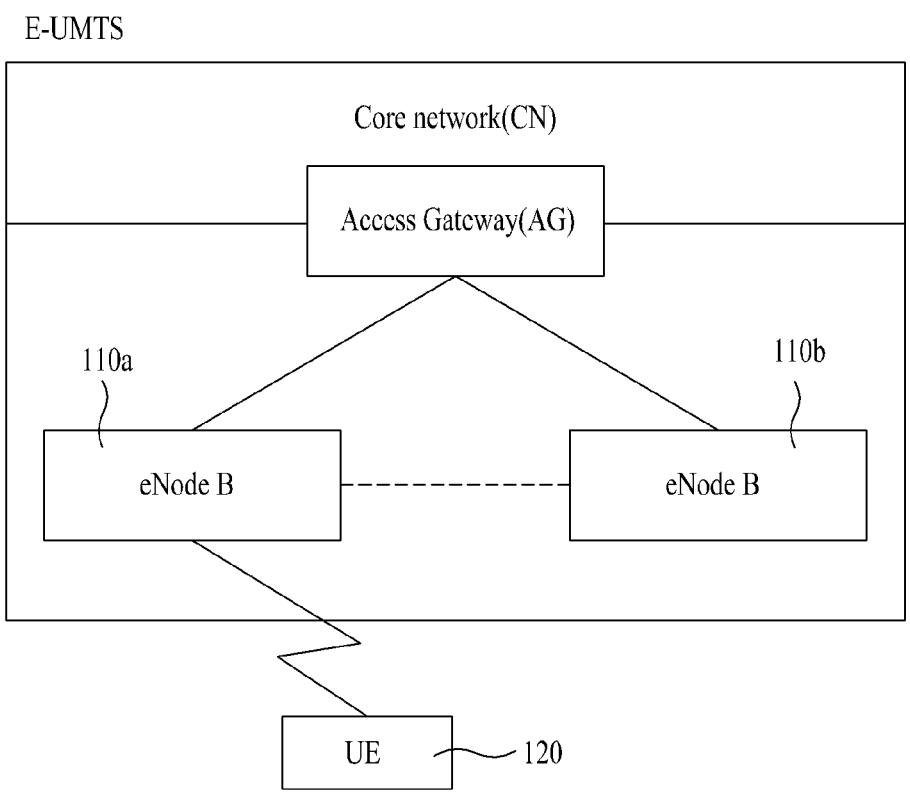
FIG. 1 is a diagram schematically showing a network structure of an E-UMTS as an exemplary radio communication system.
Figure 2:
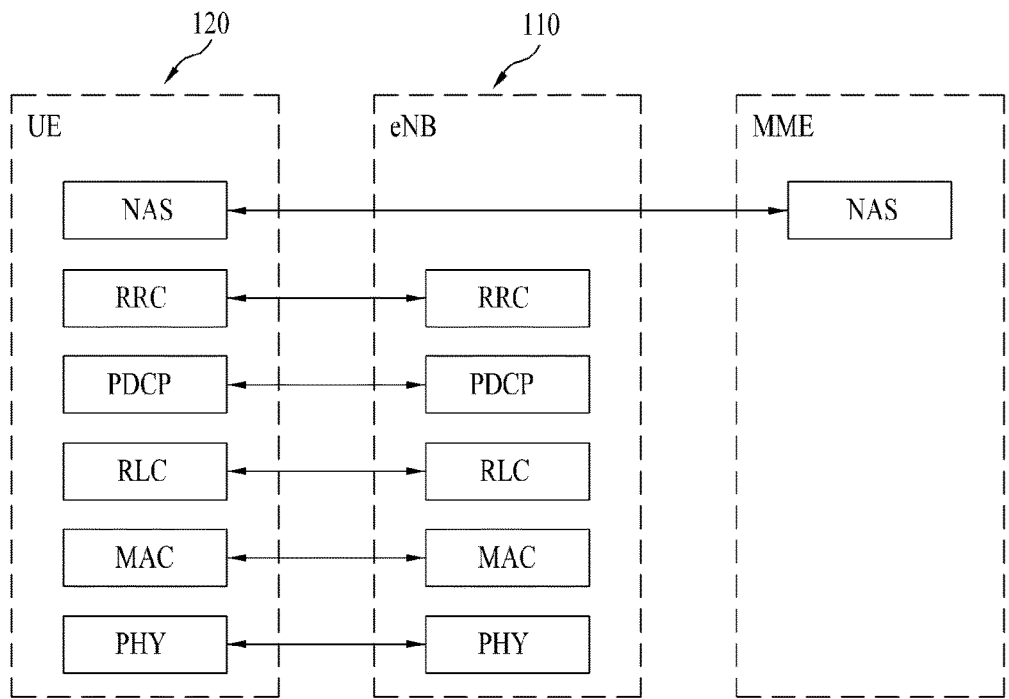
FIG. 2 is a diagram showing structures of a control plane and a user plane of a radio interface protocol between a UE and an E-UTRAN based on the 3GPP radio access network specification.
Figure 2:
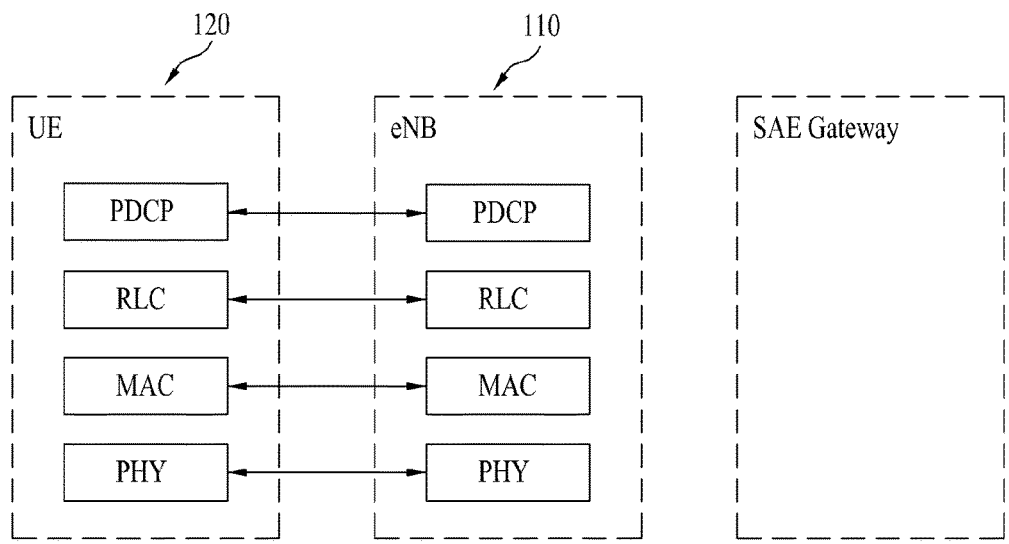

FIG. 2 is a diagram showing structures of a control plane and a user plane of a radio interface protocol between a UE and an E-UTRAN based on the 3GPP radio access network specification. The control plane refers to a path used for transmitting control messages, which are used by a User Equipment (UE) and a network to manage a call. The user plane refers to a path used for transmitting data generated in an application layer, e.g., voice data or Internet packet data.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB is set to use one of bandwidths such as 1.25, 2.5, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
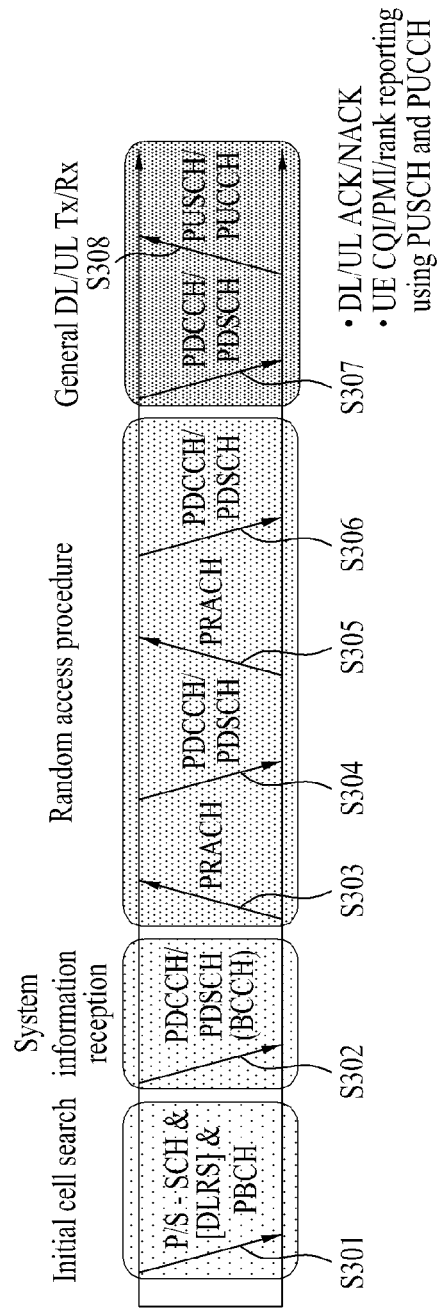
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Control information transmitted by the UE to the eNB through uplink or received by the UE from the eNB through downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
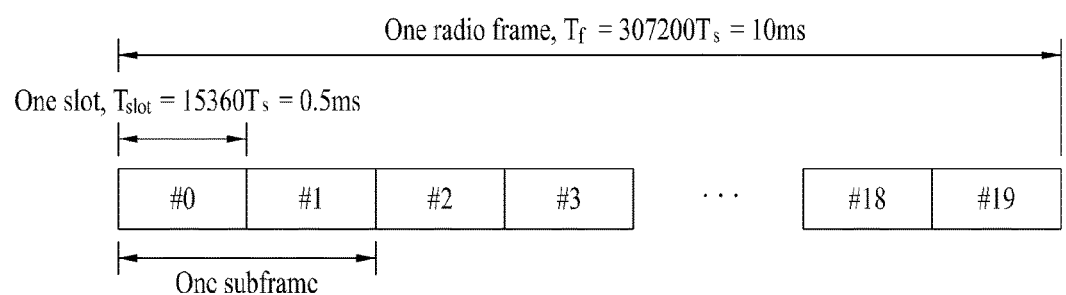
FIG. 4 is a diagram showing the structure of a radio frame used in an LTE system.

FIG. 4 is a diagram showing the structure of a radio frame used in an LTE system.

Referring to FIG. 4, the radio frame has a length of 10 ms (327200 Ts) and includes 10 equal-sized subframes. Each of the subframes has a length of 1 ms and includes two slots. Each of the slots has a length of 0.5 ms (15360 Ts). In this case, Ts denotes sampling time and is represented by Ts=1/(15 kHz×2048)=3.2552×10−8 (about 33 ns). Each slot includes a plurality of OFDM symbols or SC-FDMA symbols in a time domain and includes a plurality of resource blocks in a frequency domain. In the LTE system, one resource block includes 12 subcarriers×7 (or 6) OFDM symbols or SC-FDMA symbols. A Transmission Time Interval (TTI) which is a unit time for data transmission may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
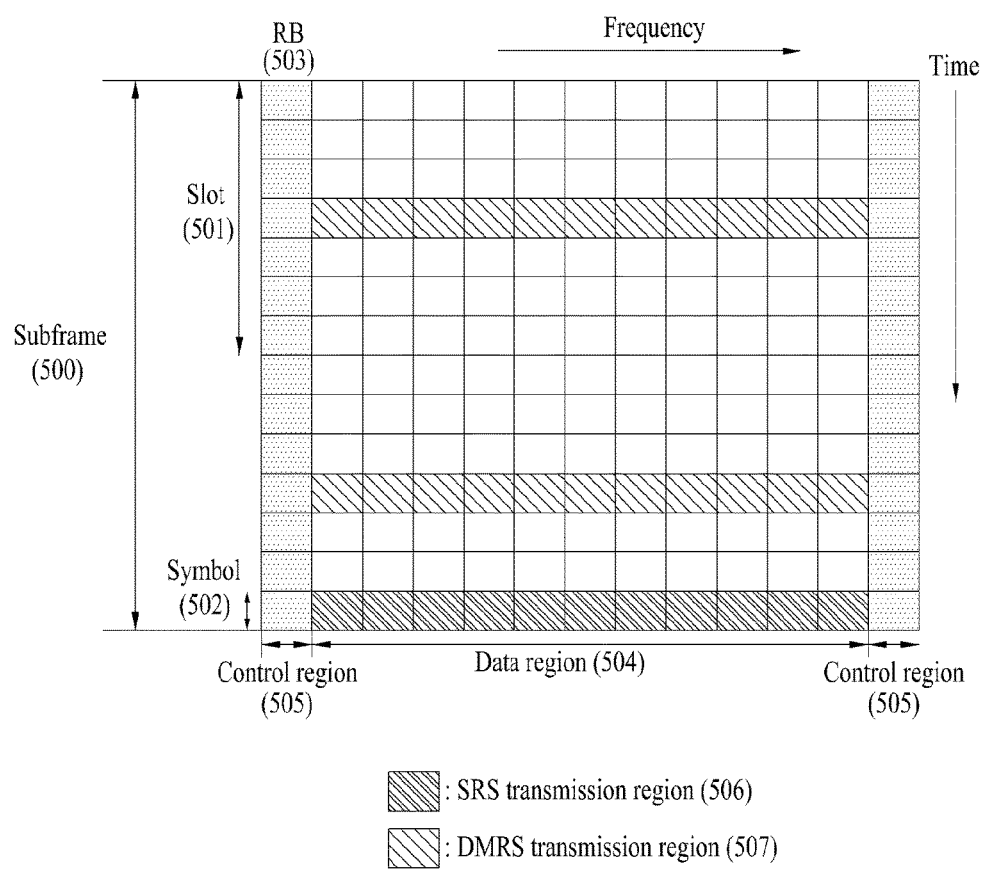
FIG. 5 is a diagram showing the structure of an uplink subframe used in an LTE system.

FIG. 5 is a diagram showing the structure of an uplink subframe used in an LTE system.

Referring to FIG. 5, a subframe 500 having a length of 1 ms, which is a basic unit of LTE uplink transmission, includes two 0.5 ms slots 501. When assuming the length of a normal Cyclic Prefix (CP), each slot includes 7 symbols 502 and one symbol corresponds to one SC-FDMA symbol. A resource block 503 is a resource allocation unit corresponding to 12 subcarriers in a frequency domain and one slot in a time domain. The structure of the LTE uplink subframe is broadly divided into a data region 504 and a control region 505. The data region refers to a series of communication resources used for transmission of data such as voice and packets transmitted to each UE and corresponds to resources except for a control region in a subframe. The control region refers to a series of communication resources used for transmission of downlink channel quality report from each UE, reception ACK/NACK for a downlink signal, uplink scheduling request, and the like.

As shown in FIG. 5, a region 506 in which Sounding Reference Signals (SRSs) can be transmitted is a duration in which an SC-FDMA symbol located at the last portion on a time axis in one subframe is present and is transmitted through a data transmission band on a frequency axis. SRSs of several UEs transmitted to the last SC-FDMA of the same subframe can be identified according to frequency positions.

An SRS is configured by a Constant Amplitude Zero Auto Correlation (CAZAC) sequence. SRSs transmitted from several UEs are CAZAC sequences ($r^{SRS}(n)=r_{u,v}^{(\alpha)}(n)$) having different cyclic shift values a according to the following Equation 1:

$$\alpha = 2\pi n_{SRS}^{cs}/8 \quad [\text{Equation 1}]$$

where $n_{SRS}^{cs}$ is a value configured for each UE by higher layers and is an integer of 0 to 7.

CAZAC sequences, which are generated through cyclic shift from one CAZAC sequence, have a characteristic in that they have a zero-correlation with sequences having cyclic shift values different therefrom. Using such a characteristic, SRSs in the same frequency domain can be identified according to cyclic shift values of CAZAC sequences. An SRS of each UE is allocated on a frequency axis according to a parameter set by a BS. A UE performs frequency hopping of an SRS so that the SRS can be transmitted throughout a total uplink data transmission bandwidth.

Hereinafter, a detailed method for mapping a physical resource for SRS transmission in an LTE system will be described.

To satisfy a transmission power $P_{SRS}$, an SRS sequence $r^{SRS}(n)$ is multiplied by an amplitude scaling factor $\beta_{SRS}$ and the SRS sequence $r^{SRS}(n)$ is mapped starting with $r^{SRS}(0)$ to a Resource Element (RE), the index of which is (k, l), according to the following Equation 2:

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \quad [\text{Equation 2}]$$

where $k_0$ denotes a frequency-domain starting point of an SRS and is defined by the following Equation 3:

$$k_0 = k'_0 + \sum_{b=0}^{B_{SRS}} 2M_{sc,b}^{RS} n_b \quad [\text{Equation 3}]$$

where $n_b$ denotes a frequency position index. In addition, $k'_0$ for a normal uplink subframe is defined by the following Equation 4 and $k'_0$ for an Uplink Pilot Time Slot (UpPTS) is defined by the following Equation 5:

$$k'_0 = (\lfloor N_{RB}^{UL}/2 \rfloor - m_{SRS,0}/2)N_{sc}^{RB} + k_{TC} \quad [\text{Equation 4}]$$

$$k'_0 = \begin{cases} (N_{RB}^{UL} - m_{SRS,0}^{max})N_{sc}^{RB} + k_{TC} & \text{if}((n_f \bmod 2) \times (2 - N_{SP}) + n_{hf}) \bmod 2 = 0 \\ k_{TC} & \text{otherwise} \end{cases} \quad [\text{Equation 5}]$$

In Equation 4 and Equation 5, $k_{TC}$ is a transmissionComb parameter signaled to a UE through higher layers and has a value of 0 or 1. Moreover, $n_{hf}$ is 0 for an UpPTS in a first half frame and 1 for an UpPTS in a second half frame. $M_{sc,b}^{RS}$ is a length of an SRS sequence, i.e. a bandwidth, expressed in the unit of a subcarrier defined by the following Equation 6:

$$M_{sc,b}^{RS} = m_{SRS,b} N_{sc}^{RB}/2 \quad [\text{Equation 6}]$$

In Equation 6, $m_{SRS,b}$ is a value signaled from a BS according to an uplink bandwidth $N_{RB}^{UL}$ as shown in the following Table 1 to Table 4.

To obtain the value $m_{SRS,b}$, a cell-specific parameter $C_{SRS}$, which is an integer of 0 to 7, and a UE-specific parameter $B_{SRS}$, which is an integer of 0 to 3 are needed. The values of the parameters $C_{SRS}$ and $B_{SRS}$ are given by higher layers.

TABLE 1

$b_{hop} = 0, 1, 2, 3$ and $6 \leq N_{RB}^{UL} \leq 40$.

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

$b_{hop} = 0, 1, 2, 3$ and $40 < N_{RB}^{UL} \leq 60$.

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

$b_{hop} = 0, 1, 2, 3$ and $60 < N_{RB}^{UL} \leq 80$.

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

$b_{hop} = 0, 1, 2, 3$ and $80 < N_{RB}^{UL} \leq 110$.

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

As described above, a UE may perform frequency hopping of an SRS so that the SRS can be transmitted throughout a total uplink data transmission bandwidth and such frequency hopping is set by a parameter $b_{hop}$ having a value of 0 to 3 given by higher layers.

If frequency hopping of an SRS is disabled, i.e., if $b_{hop} \geq B_{SRS}$, then the frequency position index $n_b$ has a constant value as shown in the following Equation 7. Here, $n_{RRC}$ is a parameter given by higher layers:

$$n_b = \lfloor 4n_{RRC}/m_{SRS,b} \rfloor \bmod N_b \quad \text{[Equation 7]}$$

Meanwhile, if frequency hopping of an SRS is enabled, i.e. if $b_{hop} < B_{SRS}$, then the frequency position index $n_b$ is defined by the following Equation 8 and Equation 9:

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Equation 8]}$$

$$F_b(n_{SRS}) = \begin{cases} (N_b/2)\left\lfloor \dfrac{n_{SRS} \bmod \Pi_{b'=b_{hop}}^{b} N_{b'}}{\Pi_{b'=b_{hop}}^{b-1} N_{b'}} \right\rfloor + \left\lfloor \dfrac{n_{SRS} \bmod \Pi_{b'=b_{hop}}^{b} N_{b'}}{2\Pi_{b'=b_{hop}}^{b-1} N_{b'}} \right\rfloor & \text{if } N_b \text{ even} \\ \lfloor N_b/2 \rfloor \lfloor n_{SRS} / \Pi_{b'=b_{hop}}^{b-1} N_{b'} \rfloor & \text{if } N_b \text{ odd} \end{cases} \quad \text{[Equation 9]}$$

where $n_{SRS}$ is a parameter calculating the number of transmissions of an SRS and is defined by the following Equation 10:

$$n_{SRS} = \begin{cases} 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor, & \text{for 2 ms SRS periodicity of TDD frame structure} \\ \lfloor (n_f \times 10 + \lfloor n_s/2 \rfloor)/T_{SRS} \rfloor, & \text{otherwise} \end{cases} \quad \text{[Equation 10]}$$

In Equation 10, $T_{SRS}$ denotes SRS periodicity, $T_{offset}$ denotes an SRS subframe offset, $n_s$ denotes a slot number, and $n_f$ denotes a frame number.

A UE-specific SRS configuration index $I_{SRS}$ for configuring the SRS periodicity $T_{SRS}$ and the subframe offset $T_{offset}$ is shown below in Table 5 and Table 6 according to FDD and TDD.

TABLE 5

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 6

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

Figure 6:
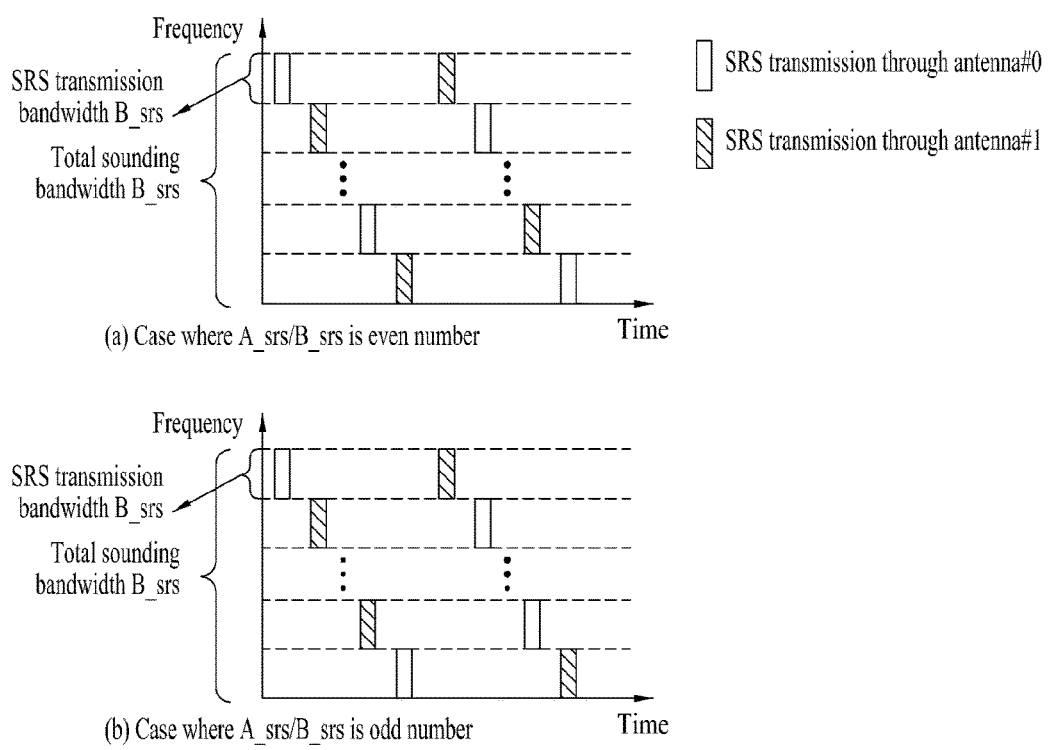
FIG. 6 is a diagram showing a general sounding reference signal transmission method to which an antenna selection scheme is applied.

A UE of a conventional LTE system transmits an uplink signal based on one Radio Frequency (RF) power amplifier chain. Especially, when a UE performs uplink transmission using two physical antennas, an antenna selection scheme which switches one RF power amplifier output to the physical antennas in a time resource region is applied. FIG. 6 is a diagram showing a general SRS transmission method to which an antenna selection scheme is applied.

Referring to FIG. 6, a method for allocating a frequency resource region of an SRS per antenna at each SRS transmission time point is shown when an SRS transmission bandwidth is less than a total system bandwidth and when a frequency hopping scheme is applied during SRS transmission. If the frequency hopping scheme is not applied during SRS transmission, SRSs are alternately transmitted using individual antennas in the same bandwidth and frequency position per SRS transmission time point.

By contrast, a UE includes a plurality of transmission antennas and a plurality of RF power amplifier chains as in an LTE-A system and can simultaneously transmit signals to uplink using the plurality of antennas.

Therefore, an SRS transmission method which can be applied to an LTE-A system, especially, a multiplexing method of an SRS will be proposed hereinbelow. In an SRS transmission method according to the present invention, uplink signal transmission using a plurality of transmission antennas at an arbitrary time point using a plurality of RF power amplifier chains is considered. In the present invention, in the case of PUSCH or PUCCH transmission, SRS transmission for antennas or layers used for the PUSCH or PUCCH transmission is performed in the same subframe as a subframe used for PUSCH or PUCCH transmission. As an SRS multiplexing scheme for supporting this, Code Division Multiplexing (CDM), Frequency Division Multiplexing (FDM), or a combination thereof may be considered in an SRS transmission symbol within any subframe.

First, a CDM scheme of an SRS according to the present invention is described. In CDM, a parameter determining multiplexing capacity is the number of available cyclic shift values. The number of available cyclic shift values is determined by the relation between a CP length of an OFDM or SC-FDMA symbol and a delay spread value of a channel. All or some of cyclic shift values demanded for SRS transmission may be explicitly or implicitly signaled from higher layers, for example, an RRC layer or may be signaled through an L1/L2 control channel.

In some cases, a base sequence index or a root index in an SRS sequence may be a parameter determining multiplexing capacity.

Figure 7:
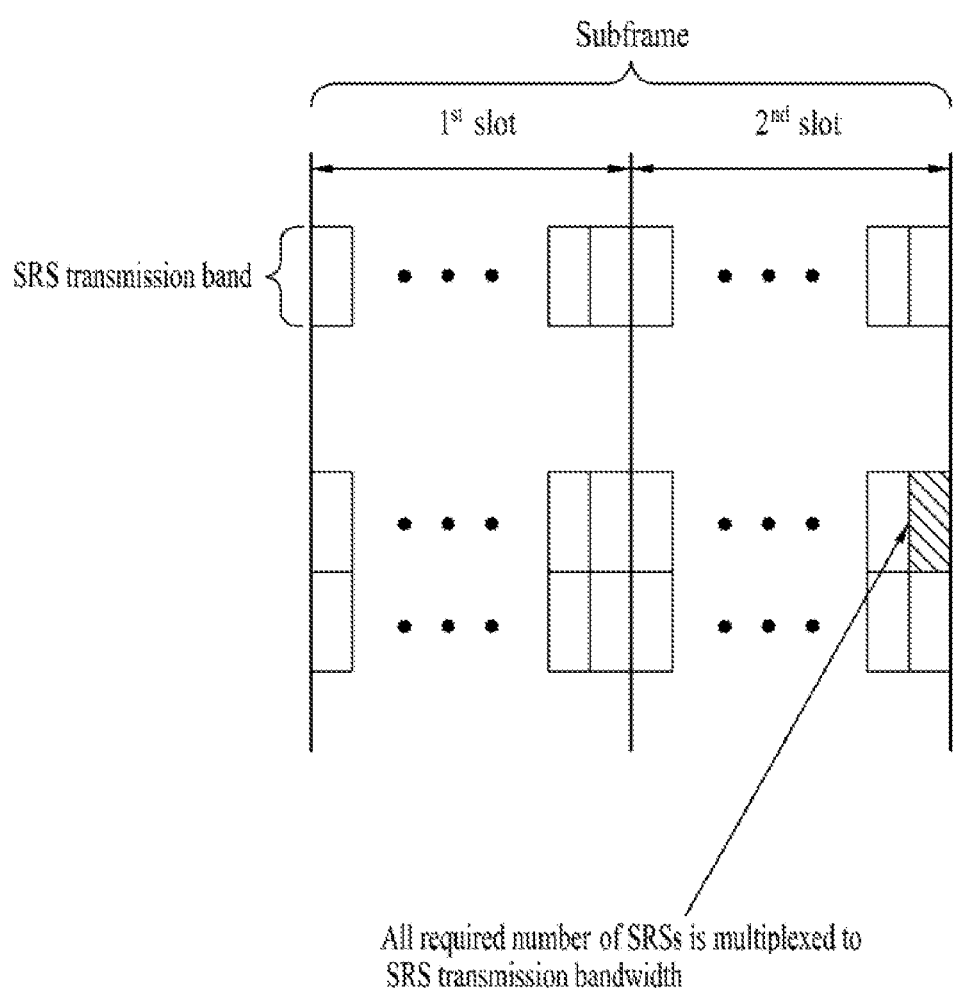
FIG. 7 is a diagram explaining a sounding reference signal transmission method in an LTE-A system according to an embodiment of the present invention.

FIG. 7 is a diagram explaining an SRS transmission method in an LTE-A system according to an embodiment of the present invention. Especially, FIG. 7 illustrates an example of multiplexing an SRS in the last OFDM or SC-FDMA symbol of a subframe using a CDM scheme.

Referring to FIG. 7, if M SRSs are to be transmitted, the M SRSs are code division multiplexed to a predetermined SRS transmission bandwidth using different M cyclic shift values (or base sequence indexes). The predetermined SRS transmission bandwidth may have various sizes according to a system bandwidth.

Next, an FDM scheme of an SRS according to the present invention is described. In applying the FDM scheme, an SRS transmission bandwidth, and a Repetition Factor (RPF) for determining a subcarrier spacing, i.e. density, used for SRS transmission may be considered as a parameter determining multiplexing capacity.

Figure 8:
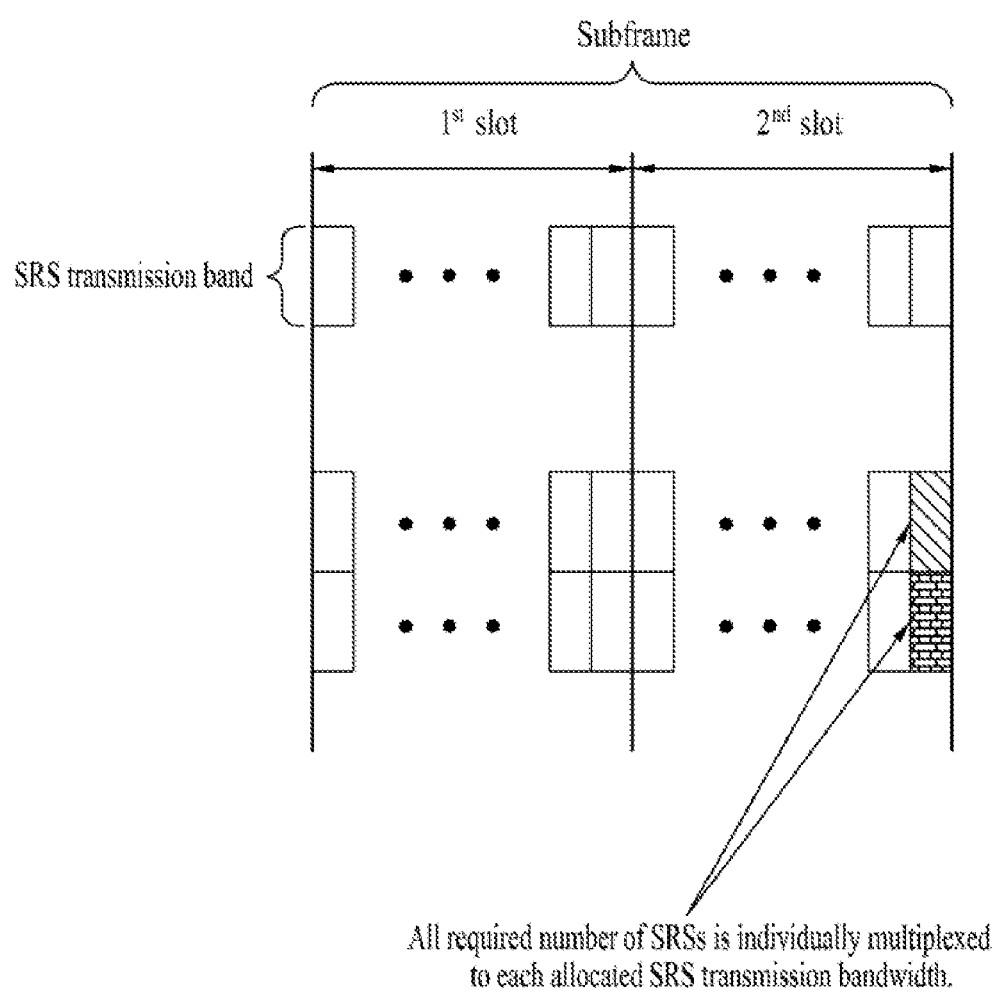
FIG. 8 is a diagram explaining a sounding reference signal transmission method in an LTE-A system according to another embodiment of the present invention.

FIG. 8 is a diagram explaining an SRS transmission method in an LTE-A system according to another embodiment of the present invention. Especially, FIG. 8 illustrates an example of multiplexing an SRS in the last OFDM or SC-FDMA symbol of a subframe using an FDM scheme.

Referring to FIG. 8, if M SRSs are to be transmitted, the M SRSs are multiplexed to a frequency axis to have different SRS transmission bandwidths or different comb patterns at the same SRS transmission bandwidth. In FIG. 8, bandwidths through which multiplexed SRSs are transmitted have various sizes with a total system bandwidth as a maximum value. Further, in FIG. 8, SRS transmission bandwidths expressed by distinguishable bands indicate inclusion of an FDM scheme for discrete physical RE comb patterns.

Figure 9:
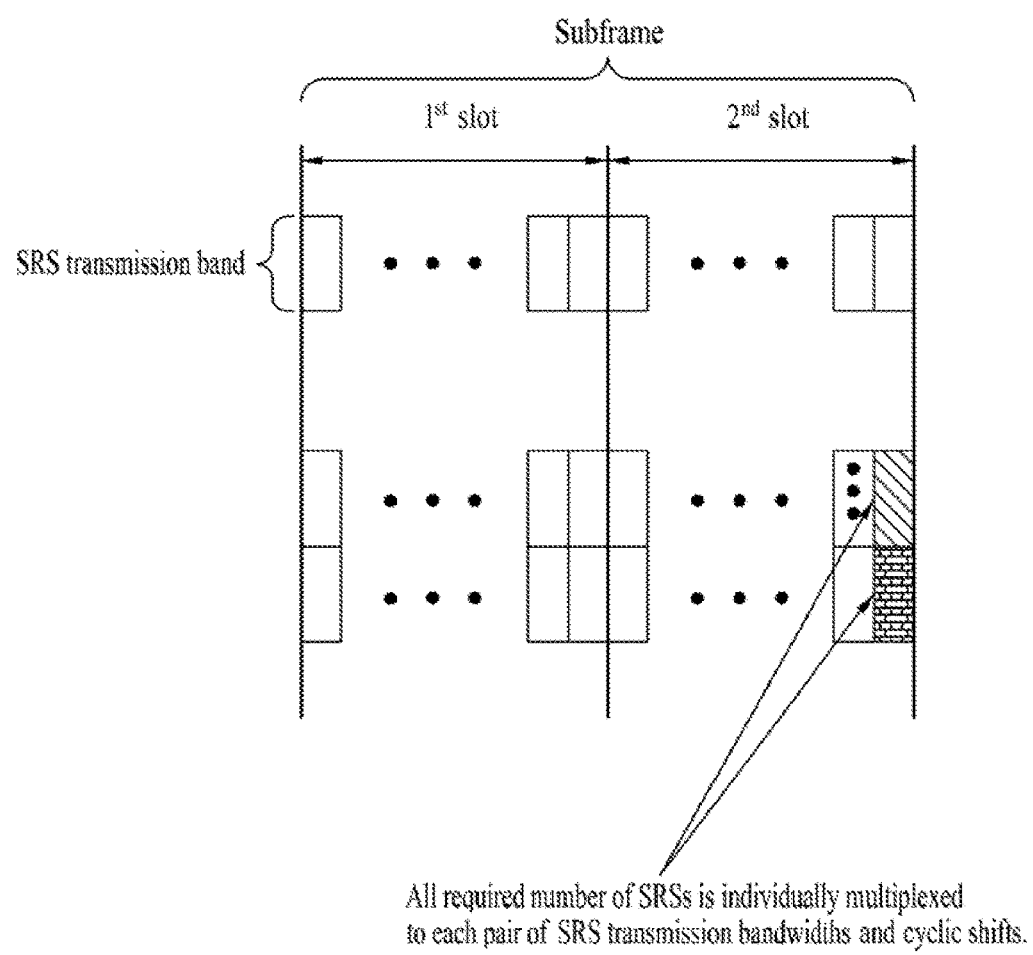
FIG. 9 is a diagram explaining a sounding reference signal transmission method in an LTE-A system according to still another embodiment of the present invention.

Finally, a combination scheme of CDM and FDM is described. FIG. 9 is a diagram explaining an SRS transmission method according to still another embodiment of the present invention. Especially, FIG. 9 illustrates an example of multiplexing an SRS in the last OFDM or SC-FDMA symbol of a subframe using a combination of CDM and FDM.

Referring to FIG. 9, if M SRSs are to be transmitted, the M SRSs are multiplexed based on a combination of different SRS transmission bandwidths and different cyclic shift values. The respective SRSs may apply FDM or CDM with priority.

It is desirable that a scheme using FDM for SRS transmission multiplexing as described with reference to FIG. 8, or a scheme using a combination of CDM and FDM as described with reference to FIG. 9 be applied to UEs which ensure transmission power sufficient to allocate a non-contiguous resource block for uplink transmission as in a clustered DFT-s-OFDMA scheme. Whether the resource allocation scheme shown in FIG. 8 is applied or the resource allocation scheme shown in FIG. 9 is applied may be implicitly or explicitly signaled from a BS.

In more detail, in order to indicate localized transmission and non-contiguous transmission which are SRS multiplexing schemes, a parameter may be defined which directs that an SRS multiplexing scheme be changed according to an uplink transmission mode of a UE or to whether transmission power of a UE is limited. A BS may inform a UE of such a parameter through UE-specific RRC signaling or L1/L2 control signaling.

Meanwhile, it has been described in a current LTE specification that an SRS continues to be transmitted until an additional termination situation occurs after the SRS is transmitted. Namely, a parameter indicating that an SRS be released has been not separately defined. The present invention proposes that a parameter directing SRS transmission release be defined through a physical layer control signal. If transmission of an SRS is directed through RRC signaling, it is desirable to transmit the SRS until a parameter directing the above SRS transmission release is received from a BS. Instead of defining the parameter directing SRS transmission release, it is possible to release SRS transmission of a UE by configuring a period, i.e. the number of transmissions of an SRS or SRS transmission time, through UE-specific RRC signaling.

Unlike a periodic SRS defined in the LTE system, if transmission of an SRS is additionally indicated through L1/L2 control signaling, the additionally transmitted SRS may be configured to be transmitted once or a limited number of times, or to be transmitted at a given period. Control signaling for one time or a limited number of times may be RRC signaling or L1 control signaling, or may be previously defined between a UE and a BS to prevent overhead for additional signaling. In this case, it is desirable that L1/L2 control signaling include the number of effective transmissions or a transmission duration. If the SRS is periodically transmitted, L1/L2 control signaling may further include period configuration information, i.e. information about a transmission interval. Here, the information about a transmission interval may indicate one subframe in which an SRS should be transmitted at each transmission period, may direct that an SRS be consecutively transmitted in a predetermined number of subframes from a transmission period time point, or may direct that an SRS be transmitted at an interval of a specific time offset in the predetermined number of subframes. The information about a transmission interval may also include information about a transmission start point. It may be considered that information about subframes or subframe groups in which an SRS is transmitted is also included in L1/L2 control signaling.

During transmission of an additional SRS, a symbol in which the additional SRS is transmitted may be configured to be allocated to the same subframe as a subframe to which an existing periodic SRS is allocated or may be configured to be allocated to a different subframe therefrom. Here, configuration of a symbol allocated to a different subframe means that, if a UE-specific SRS period defined in a conventional LTE system is 1 ms, a transmission interval of a symbol allocated to the additionally transmitted SRS is set to 2 ms, 4 ms, 5 ms, 10 ms, or 20 ms which is a multiple of a subset, i.e. the UE-specific SRS period.

In more detail, in a conventional LTE system, a subframe in which an SRS is periodically transmitted has cell-specific configuration. If a symbol for an additionally transmitted SRS is allocated to the same subframe as a subframe which is cell-specifically allocated for an existing periodic SRS as described above, the additionally transmitted SRS may also have the same configuration as the cell-specific configuration, or a subframe which is a subset form of a subframe configured to periodically transmit an SRS may be allocated for the additionally transmitted SRS.

Namely, an additional SRS indicated by L1/L2 control signaling may be transmitted in a subframe, in which an existing periodic SRS can be transmitted, in a symbol which is reserved to transmit the existing SRS, another symbol which is reserved to transmit the additional SRS, or a symbol which is allocated or reserved to transmit an uplink DM-RS.

Thus, the additional SRS may be transmitted only in a previously configured cell-specific subframe for transmission of an existing SRS and may minimize loss of uplink data throughput by performing PUSCH puncturing only in the previously configured cell-specific subframe.

Parameters of an additionally transmitted SRS may use resources used for transmission of an existing periodic SRS, for example, bandwidth configuration of a cell-specific SRS, bandwidth configuration of a UE-specific SRS, frequency start position, transmission comb parameters, etc.

Alternatively, parameters of an additionally transmitted SRS may use resources used for transmission of an additional SRS as an RRC control signal, for example, a bandwidth of a cell-specific SRS, a bandwidth of a UE-specific SRS, frequency start position, transmission comb parameters, etc., in the same way as a method used for transmission of an existing periodic SRS.

Moreover, the additionally transmitted SRS is transmitted using total band configuration usable in a system bandwidth irrespective of bandwidth configuration of a cell-specific SRS or bandwidth configuration of a UE-specific SRS. For example, if a system bandwidth is 5 MHz, 10 MHz, 15 MHz, and 20 MHz, an SRS signal occupying 24 RB, 48 RB, 72 RB, and 96 RB, respectively, may be transmitted.

Thus, the additionally transmitted SRS may be transmitted by selectively configuring the greatest available bandwidth of a system bandwidth or a partial bandwidth. That is, transmission is performed once but an SRS may be configured to be transmitted according to a given order with respect to a bandwidth of any magnitude obtained by dividing a maximum bandwidth which can be UE-specifically configured into predetermined magnitudes.

Unlike this, it may be considered that an SRS is transmitted with respect to a bandwidth greater than a maximum bandwidth which can be UE-specifically configured. This means that a UE can transmit an SRS according to indication of a BS with respect to even other bands except for a UE-specific maximum bandwidth.

Meanwhile, a time resource, i.e. a subframe position in which the additionally transmitted SRS is transmitted may conform to configuration included in Downlink Control Information (DCI) and the additionally transmitted SRS may be transmitted in a subframe having a specific relation with a subframe receiving the DCI. For example, if a parameter indicating transmission of the additional SRS and corresponding thereto is present in a downlink grant, the additional SRS may be transmitted in an uplink subframe in which Uplink Control Information (UCI) responding to the DCI or may be transmitted in a periodic or aperiodic SRS transmission resource which is cell-specifically defined first after such a subframe.

Similarly, transmission of an aperiodic SRS may be indicated together with transmission of a PUSCH for uplink through an uplink grant. Then the additional SRS may be transmitted in a subframe to which a corresponding uplink resource is allocated or may be transmitted in a periodic or aperiodic SRS transmission resource which is cell-specifically defined after such a subframe. The additional SRS may also be transmitted using a resource reserved for transmission of an existing SRS in a subframe after a given time offset from such a subframe to which a corresponding uplink resource is allocated. Here, the offset may be previously defined or may be indicated by a BS.

Figure 10:
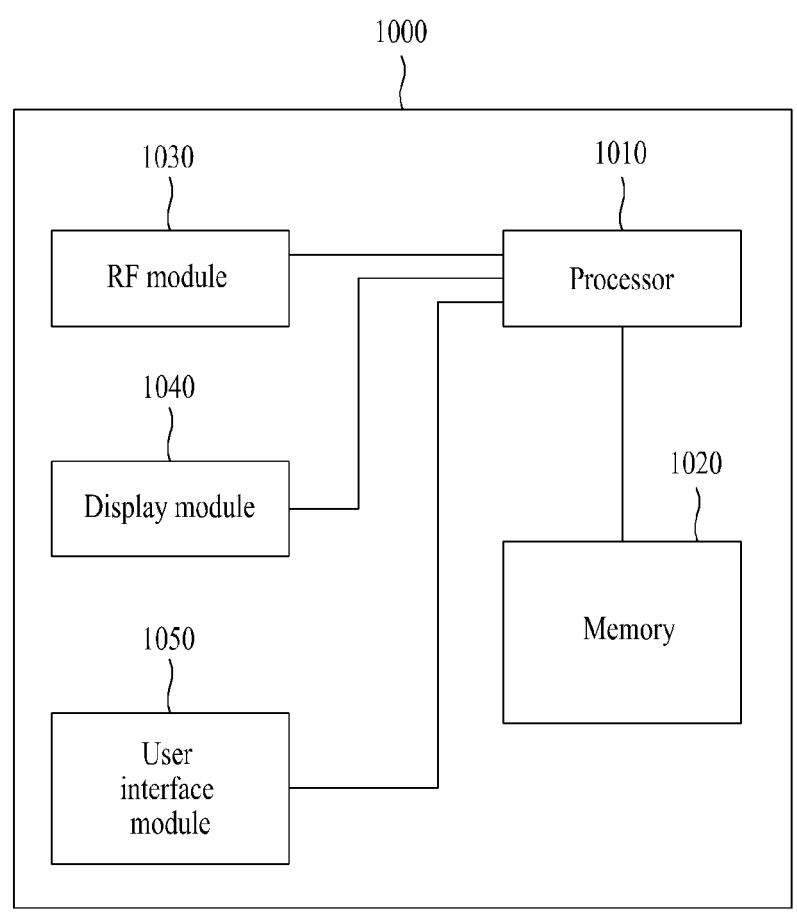
FIG. 10 is a block diagram showing the configuration of a communication transceiver according to an embodiment of the present invention.

FIG. 10 is a block diagram showing the configuration of a communication transceiver according to an embodiment of the present invention. The transceiver may be a part of a BS or a UE.

Referring to FIG. 10, a transceiver 1000 includes a processor 1010, a memory 1020, a Radio Frequency (RF) module 1030, a display module 1040, and a user interface module 1050.

The transceiver 1000 is illustrated for convenience of description and some modules thereof may be omitted. The transceiver 1000 may further include necessary modules. Some modules of the transceiver 1000 may be divided into sub-modules. The processor 1020 is configured to perform an operation according to the embodiments of the present invention described with reference to the drawings.

Specifically, if the transceiver 1000 is a part of a BS, the processor 1020 may generate a control signal to perform a function of mapping the control signal to a control channel configured within a plurality of frequency blocks. If the transceiver 1000 is a part of a UE, the processor 1020 may confirm a control channel indicted thereto for a signal received from a plurality of frequency blocks and extract a control signal from the control channel.

The processor 1020 may perform necessary operations based on the control signal. For details as to the operation of the processor 1020, reference may be made to the contents described in FIG. 1 to FIG. 9.

The memory 1020 is connected to the processor 1010 to store an operating system, applications, program code, and data. The RF module 1030 connected to the processor 1010 converts a baseband signal into a radio signal or converts the radio signal into the baseband signal. To this end, the RF module 1030 performs analog conversion, amplification, filtering up-conversion and performs an inverse process thereof. The display module 1040 is connected to the processor 1010 and displays various information. The display module 1040 may use, but is not limited to, a well-known element such as a Liquid Crystal Display (LCD), a Light Emitting Diode (LED), or an Organic Light Emitting Diode (OLED). The user interface module 1050 is connected to the processor 1010 and may be comprised of a combination of well-known user interfaces such as a keypad and a touchscreen.

The above-described embodiments are combinations of elements and features of the present invention in a predetermined type. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims which are not explicitly dependent on each other can be combined to provide an embodiment or new claims can be added through amendment after this application is filed.

In exemplary embodiments of the present invention, a description is made of a data transmission and reception relationship between a user equipment and a base station. In some cases, a specific operation described as being performed by the base station may be performed by an upper node of the base station. Namely, it is apparent that, in a network comprised of a plurality of network nodes including a base station, various operations performed for communication with a user equipment may be performed by the base station, or network nodes other than the base station. The term 'base station' may be replaced with the term 'fixed station', 'Node B', 'eNode B' (eNB), 'access point', etc. The term 'user equipment' may be replaced with the term 'mobile station', 'mobile subscriber station' (MSS), etc.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

The present invention may be applied to a wireless communication system. More specifically, the present invention is applicable to a method and apparatus for transmitting SRSs in a wireless communication system to which frequency aggregation is applied.

What is claimed is:
1. A method for transmitting an aperiodic sounding reference signal (SRS) to a base station by a user equipment (UE) in a wireless communication system, the method comprising:
  receiving, from the base station, an uplink grant or a downlink grant, with an indicator indicating a transmission of the aperiodic SRS; and
  transmitting, to the base station, the aperiodic SRS in a first uplink subframe,
  wherein the first uplink subframe is a subframe firstly configured after a second uplink subframe for the aperiodic SRS,
  wherein, if the uplink grant is received, the second uplink subframe is a subframe in which an uplink data signal scheduled by the uplink grant is transmitted, and wherein, if the downlink grant is received, the second uplink subframe is a subframe in which an uplink control signal corresponding to the downlink grant is transmitted.

2. The method according to claim 1, wherein the uplink control signal corresponding to the downlink grant is a response signal of a downlink data signal scheduled by the downlink grant.

3. The method according to claim 1, wherein the uplink data signal is transmitted via a physical uplink shared channel (PUSCH) and the uplink control signal is transmitted via a physical uplink control channel (PUCCH).

4. A user equipment (UE) in a wireless communication system, the UE comprising:
a receiving device;
a transmitting device; and
a processor configured to:
receive, from a base station, an uplink grant or a downlink grant, with an indicator indicating a transmission of an aperiodic sounding reference signal (SRS), and
transmit, to the base station, the aperiodic SRS in a first uplink subframe,
wherein the first uplink subframe is a subframe firstly configured after a second uplink subframe for the aperiodic SRS,
wherein, if the uplink grant is received, the second uplink subframe is a subframe in which an uplink data signal scheduled by the uplink grant is transmitted, and
wherein, if the downlink grant is received, the second uplink subframe is a subframe in which an uplink control signal corresponding to the downlink grant is transmitted.

5. The UE according to claim 4, wherein the uplink control signal corresponding to the downlink grant is a response signal of a downlink data signal scheduled by the downlink grant.

6. The UE according to claim 4, wherein the uplink data signal is transmitted via a physical uplink shared channel (PUSCH) and the uplink control signal is transmitted via a physical uplink control channel (PUCCH).

7. A method for receiving an aperiodic sounding reference signal (SRS) from a user equipment (UE) by a base station in a wireless communication system, the method comprising:
transmitting, to the UE, an uplink grant or a downlink grant, with an indicator indicating a transmission of the aperiodic SRS; and
receiving, from the UE, the aperiodic SRS in a first uplink subframe,
wherein the first uplink subframe is a subframe firstly configured after a second uplink subframe for the aperiodic SRS,
wherein, if the uplink grant is transmitted, the second uplink subframe is a subframe in which an uplink data signal scheduled by the uplink grant is received, and
wherein, if the downlink grant is transmitted, the second uplink subframe is a subframe in which an uplink control signal corresponding to the downlink grant is received.

8. The method according to claim 7, wherein the uplink control signal corresponding to the downlink grant is a response signal of a downlink data signal scheduled by the downlink grant.

9. The method according to claim 7, wherein the uplink data signal is received via a physical uplink shared channel (PUSCH) and the uplink control signal is received via a physical uplink control channel (PUCCH).

10. A base station in a wireless communication system, the base station comprising:
a receiving device;
a transmitting device; and
a processor configured to:
transmit, to user equipment (UE), an uplink grant or a downlink grant, with an indicator indicating a transmission of an aperiodic sounding reference signal (SRS), and
receive, from the UE, the aperiodic SRS in a first uplink subframe,
wherein the first uplink subframe is a subframe firstly configured after a second uplink subframe for the aperiodic SRS,
wherein, if the uplink grant is transmitted, the second uplink subframe is a subframe in which an uplink data signal scheduled by the uplink grant is received, and
wherein, if the downlink grant is transmitted, the second uplink subframe is a subframe in which an uplink control signal corresponding to the downlink grant is received.

11. The base station according to claim 10, wherein the uplink control signal corresponding to the downlink grant is a response signal of a downlink data signal scheduled by the downlink grant.

12. The base station according to claim 10, wherein the uplink data signal is received via a physical uplink shared channel (PUSCH) and the uplink control signal is received via a physical uplink control channel (PUCCH).

* * * * *